United States Patent
Miyanishi et al.

(10) Patent No.: US 6,687,195 B2
(45) Date of Patent: Feb. 3, 2004

(54) MAGNETIC RECORDING HEAD AND MAGNETIC RECORDING DEVICE

(75) Inventors: Shintaro Miyanishi, Ikoma-gun (JP); Kunio Kojima, Nabari (JP); Hiroyuki Katayama, Nara (JP); Hiroshi Fuji, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/014,311

(22) Filed: Dec. 11, 2001

(65) Prior Publication Data

US 2002/0075763 A1 Jun. 20, 2002

(30) Foreign Application Priority Data

Dec. 19, 2000 (JP) ........................... 2000-386023
Nov. 26, 2001 (JP) ........................... 2001-359915

(51) Int. Cl.[7] ............................................. G11B 11/00
(52) U.S. Cl. ..................................................... 369/13.13
(58) Field of Search ......................... 369/13.13, 13.02, 369/13.14, 13.01, 13.11, 13.12, 13.17, 13.2, 13.23, 13.24, 13.32, 13.33; 360/59, 114.02, 114.03

(56) References Cited

U.S. PATENT DOCUMENTS

| | | | |
|---|---|---|---|
| 5,402,293 A | * 3/1995 | Smith | 369/13.1 |
| 5,656,385 A | 8/1997 | Nakajima et al. | 428/694 T |
| 5,777,342 A | * 7/1998 | Baer | 250/492.2 |
| 5,808,973 A | * 9/1998 | Tanaka | 369/126 |
| 6,091,673 A | * 7/2000 | Murakami et al. | 369/13.12 |
| 6,130,779 A | * 10/2000 | Carlson et al. | 359/566 |
| 6,143,436 A | 11/2000 | Nakajima et al. | 428/694 ML |
| 6,167,016 A | * 12/2000 | Block et al. | 369/112.08 |
| 6,404,706 B1 | * 6/2002 | Stovall et al. | 369/13.17 |
| 2001/0040868 A1 | * 11/2001 | Ueyanagi et al. | 369/300 |

FOREIGN PATENT DOCUMENTS

JP   2881983   2/1999

OTHER PUBLICATIONS

U.S. Ser. No. 09/803,312, filed Mar. 9, 2001, entitled Composite Magnetic head Device, Information, Recording Device Reproducing Device Adopting the Same and Recording Medium, Inventor: Kojima, et al.

* cited by examiner

Primary Examiner—Carl Whitehead, Jr.
Assistant Examiner—Jennifer M Dolan
(74) Attorney, Agent, or Firm—Edwards & Angell, LLP.; David G. Conlin; George W. Hartnell, III

(57) ABSTRACT

A light emitting device for focusing a laser beam without adopting an optical lens system is provided, as well as a composite magnetic recording head and a magnetic recording device, which realize a smaller laser spot diameter and a sharp magnetic field distribution, whereby an optical-assisted high density magnetic recording can be realized, and which also realize a simplified head structure, and improvements in productivity and costs. The composite magnetic recording head is prepared by integrally forming a magnetic coil layer for use in magnetic recording at around the center of the surface-emitting laser aperture, and further, a shielding plate is formed at the center of the laser aperture. As a result, a laser beam can be focused on the irradiation surface of the magnetic recording medium at portion right below the shielding member so as to locally heat the irradiated portion, and further a magnetic field for magnetic recording is applied in the laser heated portion, thereby realizing a high density magnetic recording.

19 Claims, 13 Drawing Sheets

SPIRAL COIL FIRST LAYER

SPIRAL COIL SECOND LAYER

SPIRAL COIL THIRD LAYER

SPIRAL COIL FOURTH LAYER

MAGNETIC RECORDING HEAD AND MAGNETIC RECORDING DEVICE

FIELD OF THE INVENTION

The present invention relates to a light emitting device applicable to an optical-assisted magnetic recording head, the optical-assisted magnetic recording head, and an optical-assisted magnetic recording device.

BACKGROUND OF THE INVENTION

As a typical example for the conventional optical-assisted magnetic recording system, for example, Japanese Unexamined Patent Publication No. 4-176034/1992 (Tokukaihei 4-176034, published on Jun. 23, 1992) discloses a high density magnetic recording system. In this high density magnetic recording system, adopted is a magnetic recording medium having a film laminated structure on a transparent substrate, and a laser beam is projected on the magnetic recording medium from the side of the substrate to be focused at a portion right below a magnetic recording head section by an optical lens, thereby locally heating the magnetic recording medium. As a result, the coercive force of the heated portion is reduced, and further by applying thereto a magnetic field using the magnetic recording head, a high density recording operation can be realized.

The foregoing techniques on the optical-assisted magnetic recording system can utilize conventional techniques on a magnetic recording head or an optical system used in magneto optical recording, and therefore permit developments of various new systems in combination with the existing technology with ease. Further, since a magnetic recording operation can be performed in an overlapped area between the magnetic head and the laser beam spot, a still finer bit recording can be performed, thereby realizing a high density magnetic recording.

In the foregoing conventional techniques, however, in order to realize high density magnetic recording, a high precision servo system is required for the positioning of a magnetic recording head and a laser focusing position. Besides, with the above conventional system, it is difficult to perform a both-sided magnetic recording.

In response, Japanese Patent No. 2881983 (issued on Apr. 12, 1999, (Japanese Unexamined Patent Publication No. 4-67451/1992 (Tokukaihei 4-67451), published on Mar. 3, 1992)) discloses a magneto-optical recording technique which solves the above problem although the optical-assisted magnetic recording technique is not adopted. This Japanese patent discloses the laser focusing technique from the side of a coil for use in magnetic recording using a composite magnetic recording head wherein an optical system for focusing a laser beam and the coil for use in magnetic recording are combined. In this technique, the both sides of the recording medium can be utilized. Therefore, the foregoing laser focusing technique is applicable to not only the conventional single-sided magneto-optical recording but also both-sided magneto-optical recording. Moreover, with the described technique, the servo system for use in positioning the magnet coil and the laser light spot can be omitted, thereby simplifying the overall structure of the system.

However, in the magneto-optical recording adopting the above composite magnetic recording head, an optical lens system is adopted for focusing, and therefore the head becomes complicated in structure, larger in size and heavier, yet high precision is required for the relative positioning of the coil and the optical system.

Moreover, when forming a super resolution image of a laser utilizing the apotization effect using a conventional lens, a phase shift occurs due to aberration of an optical system, particularly an aberration of the lens, resulting in a broader intensity distribution of the laser beam. The above super resolution image enables recording and reproduction in a smaller area than a beam spot utilizing the intensity distribution of the laser beam at a beam spot. In this case, it is therefore not possible to utilize the effects of high density recording and reproduction by the super resolution image effectively. On the other hand, in order to eliminate the aberration of the lens, an optical system of a complicated structure or a high precision optical lens is required.

In the described conventional composite magnetic recording head, the problems in terms of productivity and the cost remain unsolved.

By the way, in order to realize an optical-assisted high density magnetic recording, it is required to reduce the laser spot diameter and to have a sharp magnetic field distribution at the center of the laser spot.

In the conventional composite magnetic recording head adopting the optical lens, however, it is not possible to reduce the laser spot diameter to not more than 100 nm by the effect of optical diffraction. Moreover, in the above conventional magneto-optical recording system, the magnet coil and the magnetic recording medium are positioned at a large interval, and therefore, a sharp magnetic field distribution cannot be obtained at the center of the laser spot.

SUMMARY OF THE INVENTION

It is an object of the present invention to provide a light emitting device for focusing a laser beam without adopting an optical lens system, and also to provide a composite magnetic recording head and a magnetic recording device, which realize a smaller laser spot diameter and a sharp magnetic field distribution, whereby an optical-assisted high density magnetic recording can be realized, and which also realize a simplified head structure, and improvements in productivity and costs.

In order to obtain the above object, the present invention realizes an optical-assisted magnetic recording by utilizing the microfabrication technique. Specifically, for example, by adopting a composite magnetic recording head wherein a magnet coil and a main magnetic pole are formed directly at a laser aperture serving as a laser emitting surface of a surface-emitting semiconductor laser (light source), a laser beam is focused at portion right below a shielding member by the apodization effect, thereby realizing the optical-assisted magnetic recording.

In the present invention, the laser aperture is defined as a laser beam emitting area (an area through which the laser beam is emitted), and in the case of limiting the emitting area by a shielding member such as mask, etc., as other area than the shielded area by the shielding member, through which the laser beam can be projected.

In general, when the radius of the laser aperture is around a half wavelength of the laser beam, and the laser aperture and the irradiation surface (in the present invention, the surface of the magnetic recording medium) are positioned at an interval of not more than 100 nm, the light beams emitted from the periphery and the center of the laser aperture are attenuated one another on the irradiation surface at portion right below the aperture for the following reason. That is, respective paths of the laser beams emitted from the center and the periphery of the laser aperture are displaced from one another by around the radius of the laser aperture, i.e., the half wavelength, and the respective light beams are therefore countervailed. In response, for example, a shielding member may be formed at the center of the aperture so as to shield the light beam projected from the center of the laser aperture. In this way, it becomes possible to focus the light projected from the periphery of the laser aperture on the irradiation surface at portion right below the shielding member. The described phenomenon is called "apodization effect".

By utilizing the foregoing apodization effect, a laser beam of a desired intensity can be obtained by adjusting the area of the aperture. Further, by providing the shielding member at the center of the aperture, it becomes possible to focus the laser beam at portion right below the shielding member. In the foregoing method of emitting a light beam, a passive optical system can be omitted, thereby simplifying the structure of the light emitting device.

In order to achieve the above object, the light emitting device of the present invention is characterized by including:

a light source for emitting a laser beam having a wavelength $\lambda$, wherein a laser aperture serving as a laser emitting surface has a radius R within the range of: $\lambda/2+a\lambda \leq R \leq 1.3\lambda+a\lambda$ (a is 0 or a positive integer ($a \geq 0$)); and a shielding member for shielding only a laser beam, which passes through a predetermined area at a center of the laser aperture, of all laser beams which pass through the laser aperture.

According to the foregoing structure, the apodization effect of the laser beam appears. The laser beam can be focused without using the lens.

In order to achieve the above object, the magnetic recording head of the present invention which includes a light source for emitting a laser beam and a magnet coil for use in magnetic recording, is characterized in that the magnet coil is integrally provided with the light source at around a center of the laser aperture serving as the laser emitting surface of the light source.

According to the foregoing structure, by adopting the light source and the magnet coil which are formed in one integral part, a magnetic recording can be performed from the side of emitting a laser beam. With the foregoing positioning of the light source and the magnet coil, a perpendicular magnetic field can be applied onto the surface of the aperture at the center of the laser aperture, and the foregoing structure is therefore effective in performing a perpendicular magnetic recording. Further, by reducing the radius of the magnet coil formed at the center of the laser aperture to a size of several $\mu$m, it is possible to apply a strong magnetic field at around the center of the laser aperture.

In order to achieve the above object, the magnetic recording device of the present invention is characterized by including:

light emitting means, which includes a) a light source for emitting a laser beam having a wavelength $\lambda$, wherein a laser aperture serving as a laser emitting surface has a radius R within the range of: $\lambda/2+a\lambda \leq R \leq 1.3\lambda+a\lambda$ (a is 0 or a positive integer ($a \geq 0$)), and b) a shielding member for shielding only a laser beam, which passes through a predetermined area at a center of the laser aperture, of all laser beams which pass through the laser aperture; and a magnet coil for applying a magnetic field onto a magnetic recording medium, wherein the light emitting means forms a light spot by focusing a laser beam onto the magnetic recording medium using the shielding member; and the magnet coil applies the magnetic field for use in magnetic recording in an area including a light spot forming region of the magnetic recording medium.

According to the foregoing structure, the light emitting means is arranged so as to include the light source for emitting a laser beam having a wavelength $\lambda$, wherein the laser aperture has a radius R within the range of $\lambda/2+a\lambda \leq R \leq 1.3\lambda+a\lambda$ (a is 0 or a positive integer ($a \geq 0$)), and the shielding member for shielding only a laser beam, which passes through a predetermined area at a center of the laser aperture, of all laser beams which pass through the laser aperture. As a result, a laser spot can be formed by the apodization effect onto the magnetic recording medium at portion right below the shielding member.

With the foregoing structure, it is possible to perform a high density magnetic recording in an overlapped area between a thermal distribution of a magnetic recording medium generated by the laser spot focused at portion right below the shielding member and a magnetic flux distribution as applied by the magnet coil.

For a fuller understanding of the nature and advantages of the invention, reference should be made to the ensuing detailed description taken in conjunction with the accompanying drawings.

DESCRIPTIONS OF THE EMBODIMENTS

First Embodiment

The following descriptions will discuss one embodiment of the present embodiment in reference to Figures. In the present embodiment, explanations will be given through the case where the present invention is applied to a composite magnetic recording head provided with a light emitting device.

Figure 1:
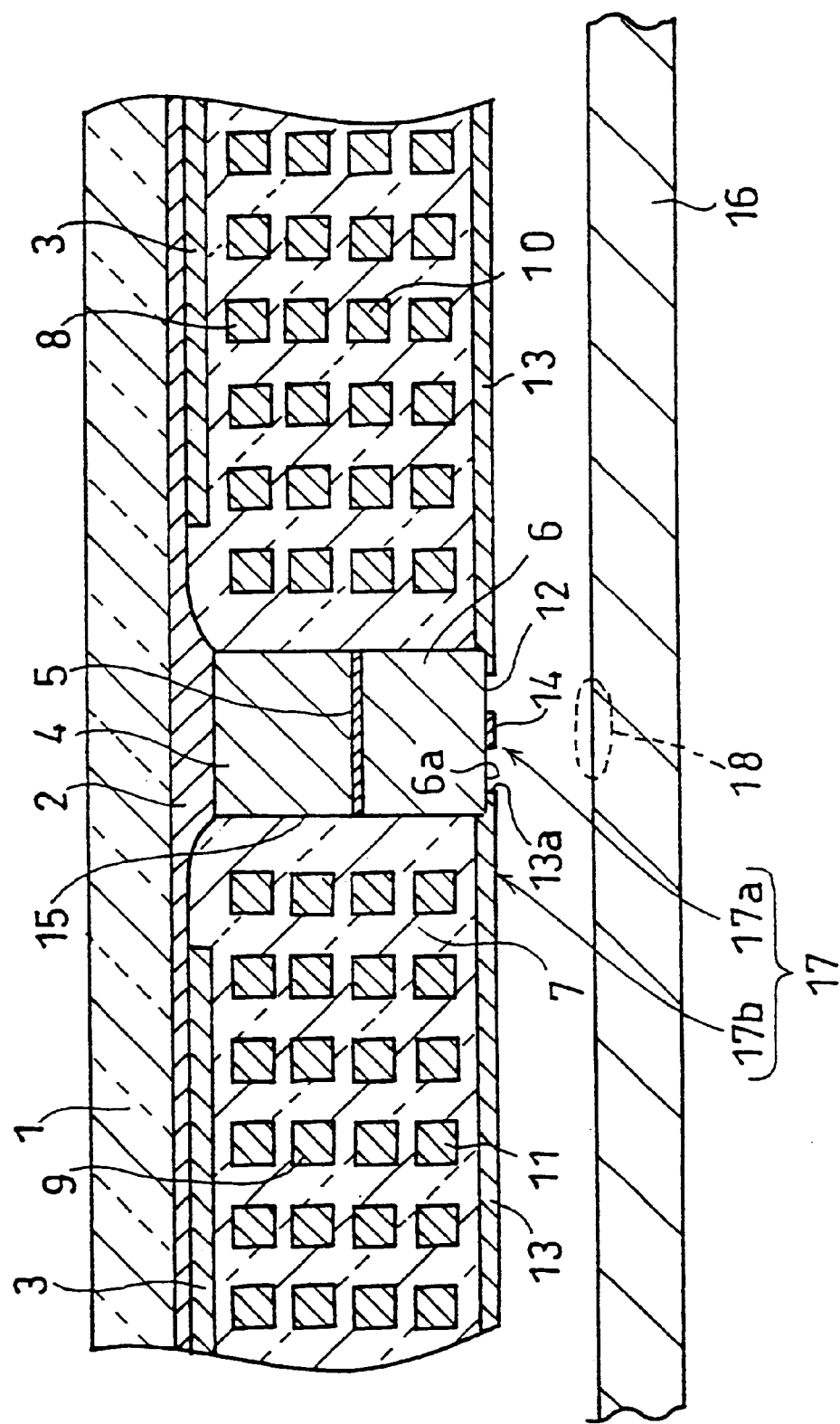
FIG. 1 is a cross-sectional view of essential parts in the structure of a composite magnetic recording head in accordance with one embodiment of the present invention.

A composite magnetic recording head 17 in accordance with this embodiment of the present invention is illustrated in FIG. 1. In FIG. 1, the composite magnetic recording head 17 is upended so as to face a magnetic recording medium 16.

The composite magnetic recording head 17 includes a light source 17a as a light emitting device for emitting a laser beam with respect to the magnetic recording medium 16, and a magnet coil 17b mounted on the periphery of the light source 17a, for applying a magnetic field onto the magnetic recording medium 16.

The light source 17a is structured such that columnar surface-emitting laser layers 4, 5 and 6 are laminated in this order on a high density doping semiconductor layer 2 formed on a substrate 1. Therefore, in the light source 17a having the foregoing structure, the outer surface of the surface-emitting laser layer 6 nearest to the magnetic recording medium 16 serves as a light emitting surface 6a.

In the light source 17a, drive current is supplied to the surface-emitting laser layers 4, 5 and 6 from a drive source (not shown) by a lower electrode 3 and an upper electrode 13, whereby the light source 17a emits a laser beam of a predetermined intensity onto the magnetic recording medium 16.

The magnet coil 17b is structured such that a four-layer structure wherein spiral coil layers 8, 9, 10 and 11 are laminated in an insulating member 7 formed on the lower electrode 3 on the high density doping semiconductor layer 2.

On the upper surface of the magnet coil 17b, facing the magnetic recording medium 16, provided is the upper electrode 13. On the upper electrode 13, an aperture 13a is formed at its center so as to expose the light emitting surface 6a of the surface-emitting laser layer 6. Based on this aperture 13a of the upper electrode 13, the size of an aperture 12 of the light source 17a (hereinafter referred as a laser aperture 12) is determined.

The light source 17a includes the aperture 13a of the upper electrode 13, which serves as an aperture forming member, the high density doping semiconductor layer 2 and the surface-emitting laser layers 4, 5 and 6, which serve as a laser emitting member. Namely, the surface on the light emission side of the surface-emitting laser layers 4, 5 and 6 is covered with the aperture 13a of the upper electrode 13, thereby limiting the laser beam emitting area. With this structure, the outer radius of the laser aperture 12 is set to be not more than the radius of the surface on the light emission side of the surface-emitting laser layers 4, 5 and 6 by the aperture 13a of the upper electrode 13. Here, the surface on the light emission side of the surface-emitting laser layers 4, 5 and 6 indicates a bottom surface of the laser-emitting layer 4 including the light emitting surface 6a.

Drive current is applied to the magnet coil 17b from a drive source (not shown). Specifically, the drive current flows from an outer end 8b of the spiral coil first layer 8 to an outer end 11b of the spiral coil fourth layer 11, whereby the drive current is supplied to each of the spiral coil layers 8, 9, 10 and 11 respectively. In this way, a magnetic field of a predetermined intensity can be applied onto the magnetic recording medium 16.

Figure 2:
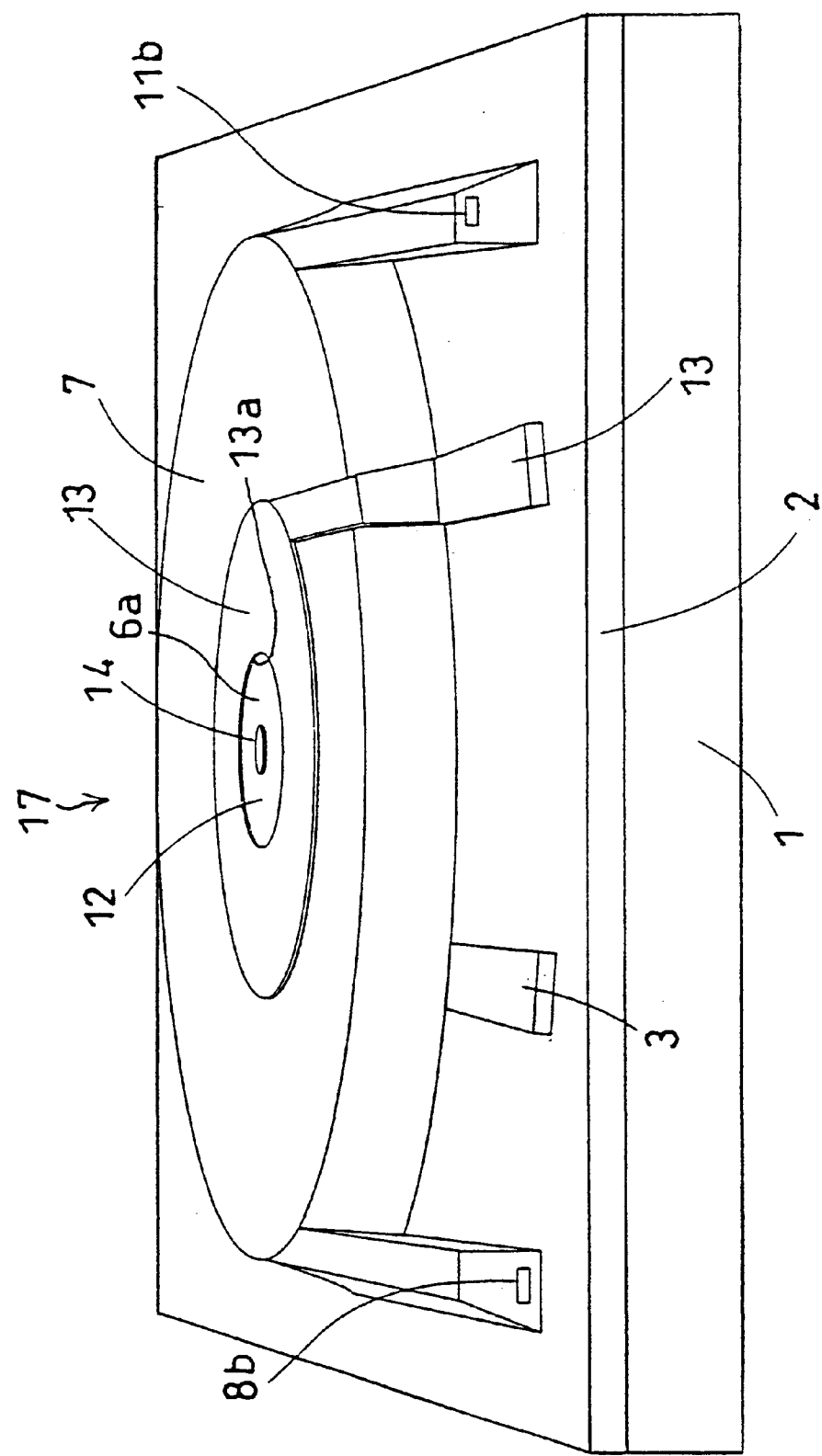
FIG. 2 is a view schematically showing the structure of the composite magnetic recording head of FIG. 1.
Figure 3:
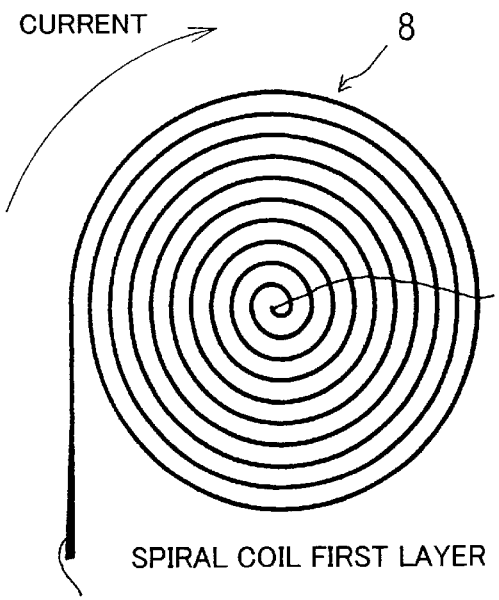
FIG. 3(a) is a view schematically showing a pattern of a first layer of a spiral coil provided in the composite magnetic recording head of FIG. 1.
FIG. 3(b) is a view schematically showing a pattern of a second layer of the spiral coil provided in the composite magnetic recording head of FIG. 1.
FIG. 3(c) is a view schematically showing a pattern of a third layer of the spiral coil provided in the composite magnetic recording head of FIG. 1.
FIG. 3(d) is a view schematically showing a pattern of a fourth layer of the spiral coil provided in the composite magnetic recording head of FIG. 1.
Figure 3:
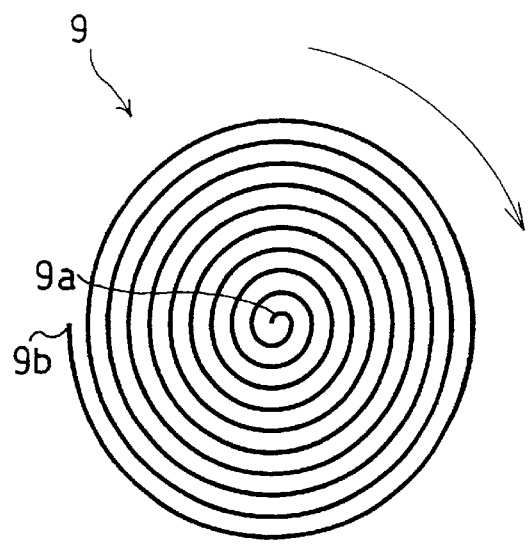
Figure 3:
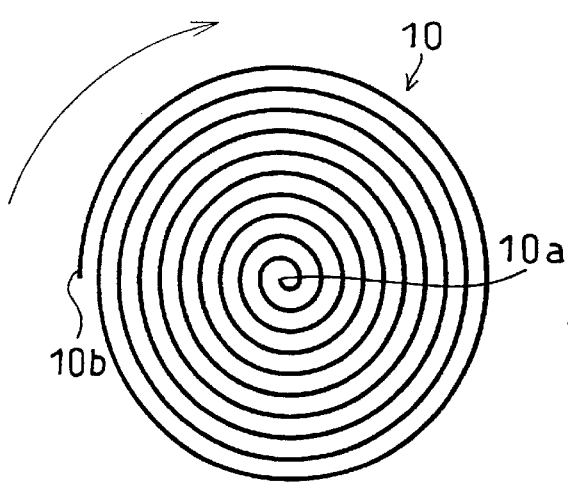
Figure 3:
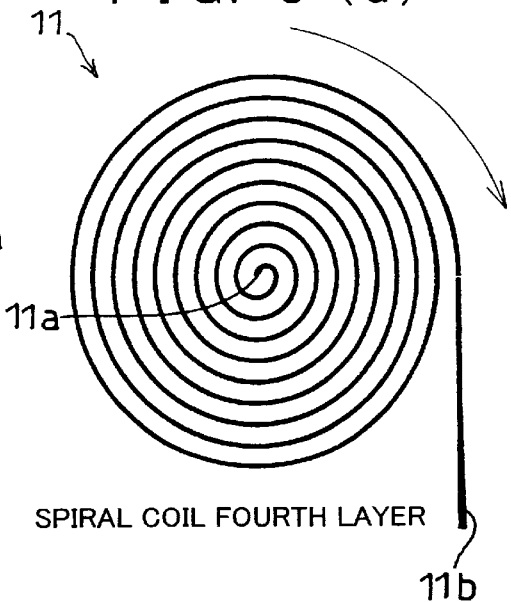

At the center of the laser aperture 12 formed on the upper surface of the magnet coil 17b, as illustrated in FIG. 2, provided is a circular shielding plate (shielding member) 14 for shielding only a laser beam which passes through the center of the laser aperture 12. The shape of the laser aperture 12 is determined by the shielding plate 14 and the aperture 13a of the upper electrode 13. In FIG. 2, the laser aperture 12 has a doughnut shape.

The laser beam emitted from the laser aperture 12 is focused on an irradiation surface 18 of the magnetic recording medium 16. This laser beam is focused by utilizing the below-explained "apodization effect".

In the following, a laser beam focusing scheme in the composite magnetic recording head 17 will be explained.

To begin with, the apodization effect will be explained. When the laser aperture has a radius in a range of from a half wavelength to a full wavelength of the laser beam, and the laser aperture and the irradiation surface (in the present invention, the surface of the magnetic recording medium) are positioned at an interval of not more than 100 nm, the light beams emitted from the periphery and the center of the aperture are attenuated one another on the irradiation surface at portion right below the aperture for the following reason. That is, respective paths of the laser beams emitted from the center and the periphery of the laser aperture are displaced from one another approximately by the radius of the laser aperture, i.e., the half wavelength, and therefore the respective light beams are countervailed.

In response, the shielding plate 14 is formed at the center of the aperture so as to shield the light beam projected from the center of the aperture. In this way, it becomes possible to focus the light beam projected from the periphery of the laser aperture on the irradiation surface at portion right below the shielding plate. This scheme is called "apodization effect".

As described, by placing the shielding plate 14 at the center of the laser aperture 12, it is possible to shield the laser beam emitted from the center of the laser aperture 12. As a result, the light beam emitted from the periphery of the laser aperture 12 can be focused on the irradiation surface 18 on the magnetic recording medium 16 at portion right below the shielding plate 14.

Next, respective sizes of the shielding plate 14 and the laser aperture 12 will be explained. In the case of adopting a red laser (wavelength: 650 nm), when adopting the laser aperture 12 with a diameter of approximately the laser wavelength, the laser aperture 12 and the irradiation surface 18 (in the present invention, the surface of the magnetic recording medium 16) are positioned at an interval of not more than 100 nm, respective paths of the laser beams emitted from the center and the periphery of the laser aperture 12 are displaced from one another approximately by the radius of the laser aperture, i.e., the half wavelength (325 nm), and therefore the respective light beams are countervailed.

Here, in order to obtain optimal conditions with regard to respective sizes of the aperture diameter and the shielding plate for focusing the laser beam to a portion right below the shielding plate 14a, simulation is performed on optical interference. As a result of this simulation, by placing the shielding plate 14 with a diameter of from ¼ to full wavelength in the laser aperture 12 with a diameter of from full wavelength to double wavelength, so as to shield the light beam emitted from the center of the laser aperture 12, the laser beams emitted from the periphery of the shielding plate 14 can be focused on the irradiation surface 18 at portion right below the shielding member 14. In this way, by blocking the light beam emitted from the center of the laser aperture 12, the laser beam emitted from the periphery of the shielding plate 14 can be focused on the irradiation surface 18 at portion right below the shielding plate 14.

Further, the results of detailed simulation performed on the optical interference will be explained in reference to FIG. 9 to FIG. 13.

Figure 9:
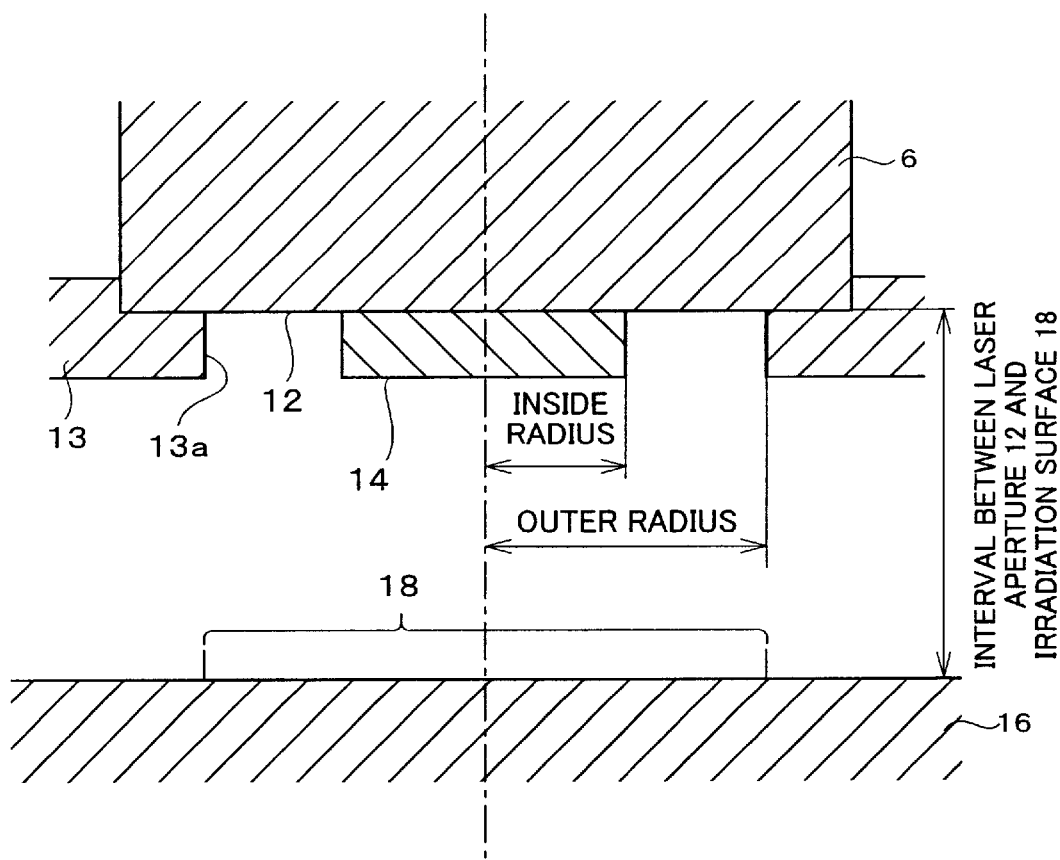
FIG. 9 is an explanatory view which explains a relationship between a laser aperture of the composite magnetic recording head and an irradiation surface shown in FIG. 1.

As illustrated in FIG. 9, the outer radius of the laser aperture 12 indicates the radius of the periphery of the laser emitting area, and the inside radius of the laser aperture 12 indicates the radius of the shielding plate 14.

FIG. 10 through FIG. 13 show the results of the simulations performed using a red laser beam (wavelength: 650 nm) under various different conditions, which respectively explain the relationship between the irradiation surface 18 and the peak intensity of the laser beam.

In the present invention, the range for optimal condition for focusing the laser beam is defined such that the first peak intensity of the laser beam is not less than 3 times of the second peak intensity for the following reason. That is, when the laser beam is projected onto the irradiation surface 18, if the first peak intensity of the laser beam is less than 3 times of the second peak intensity, the temperature profile of the magnetic recording medium 16 becomes broad by the effect of the thermal diffusion from the second peak intensity.

Figure 10:
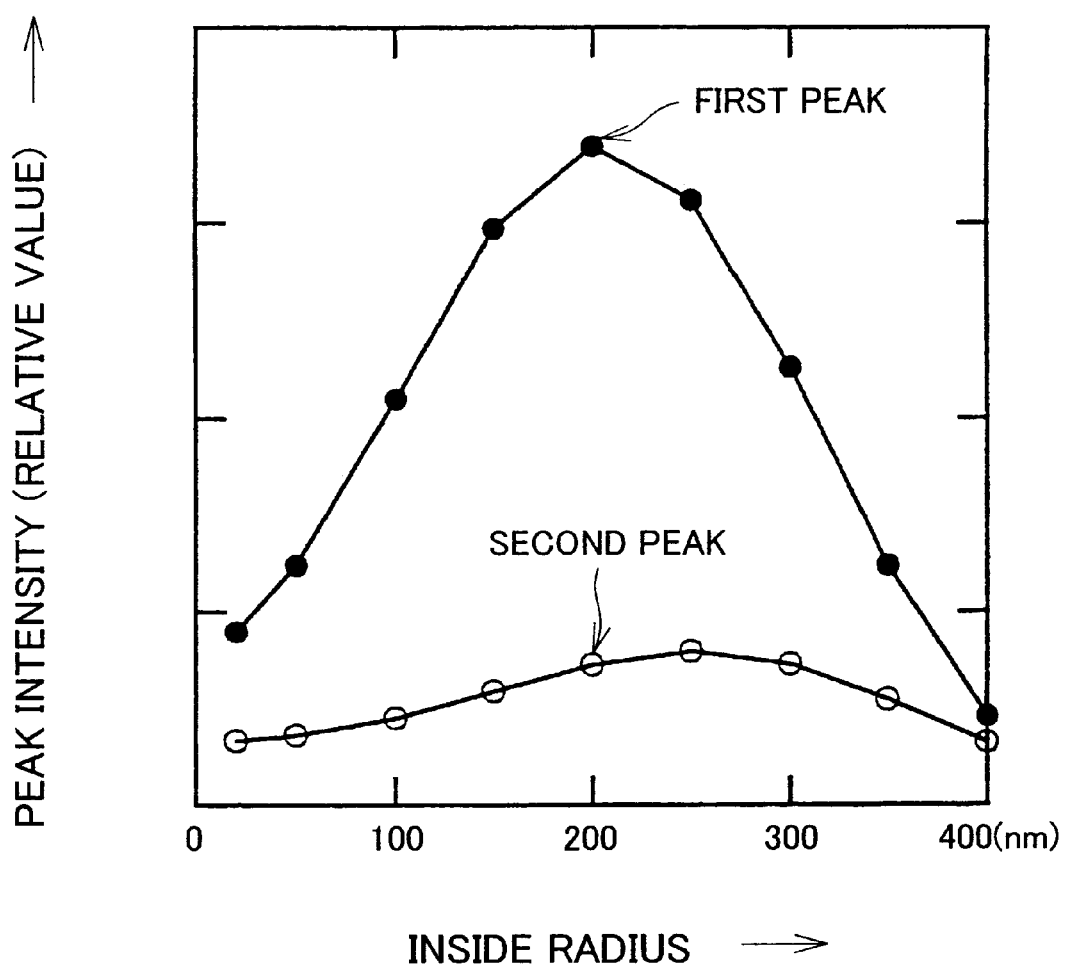
FIG. 10 is a graph showing the results of simulation on the relationship between an inside radius of a laser aperture and a peak intensity of a laser beam when the laser beam is applied uniformly.

FIG. 10 shows the results of simulation performed on the first peak intensity of the laser beam at portion right below the shielding plate 14 and the second peak (sub-peak, see FIG. 4) at portion beside the portion of the first peak intensity when applying the laser beam from the laser aperture 12 uniformly, with changes in inside radius, and a fixed outer radius of the laser aperture 12 of 550 nm. It can be seen from FIG. 10 that both the first and second peak intensities of the laser beam are maximized at around the inside radius of the laser aperture of 220 nm. Here, the range for the inside radius of the laser aperture 12, which ensures the optimal condition for laser focusing, i.e., the first peak intensity of the laser beam is not less than 3 times of the second peak intensity, is from 0.08 to 0.5 times of the wavelength 650 nm of the laser beam.

Figure 11:
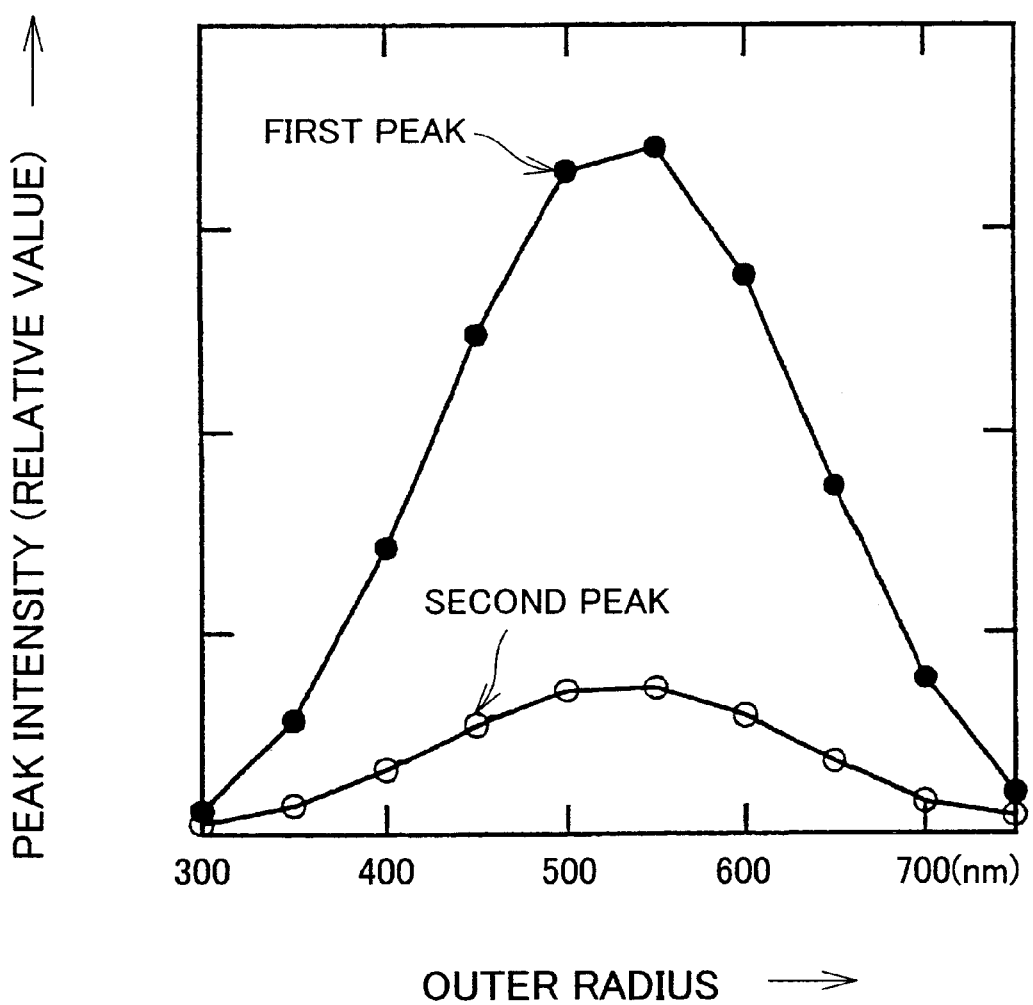
FIG. 11 is a graph showing the results of simulation on the relationship between the outer radius of the laser aperture and the peak intensity of the laser beam when the laser beam is applied uniformly.

FIG. 11 shows the results of simulation on the first peak intensity of the laser beam at portion right below the shielding plate 14 and the second peak (sub-peak, see FIG. 4) at portion beside the portion of the first peak intensity when applying the laser beam from the laser aperture 12 uniformly, with changes in outer radius and a fixed inside radius of the laser aperture 12 of 200 nm. It can be seen from FIG. 11 that both the first and second peak intensities of the laser beam are maximized at around the outer radius of the laser aperture 12 of 550 nm. Here, the range for the outer radius of the laser aperture 12, which ensures the optimal condition for the laser focusing, i.e., the first peak intensity of the laser beam is not less than 3 times of the second peak intensity, is from 0.5 to 1.0 times of the wavelength 650 nm of the laser beam.

Further, other simulation was performed under different conditions of the aperture of the laser aperture 12. The simulation showed that the first peak intensity and the second peak intensity fluctuated at a cycle of a laser wavelength, with respect to the inside radius and the outer radius of the laser aperture 12. Namely, it could be seen that the peak intensity of the laser beam appeared by the interference effects when the laser wavelength was shifted by an integer multiple of the laser wavelength together with the inside radius and the outer radius of the laser aperture 12.

As described, in the case where the laser beam having a wavelength λ is applied uniformly, the range for the optimal condition for the laser aperture 12 which satisfies the above condition is the range where the outer radius R and the inside radius r of the laser aperture are set within the ranges of:

$\lambda/2 + a\lambda \leq R \leq 1.0\lambda + a\lambda$ (a is 0 or a positive integer (a≧0)); and $0.08\lambda + b\lambda \leq r \leq 0.5\lambda + b\lambda$ (b is 0 or a positive integer not larger than a (0≦b≦a)).

The foregoing simulation was performed on the assumption that the laser beam was applied from the laser aperture 12 uniformly. In the following example, the simulation was performed on the assumption that the laser beam had intensity distribution. In this example, the simulation was performed on the assumption that the laser beam had a Gaussian distribution.

Figure 12:
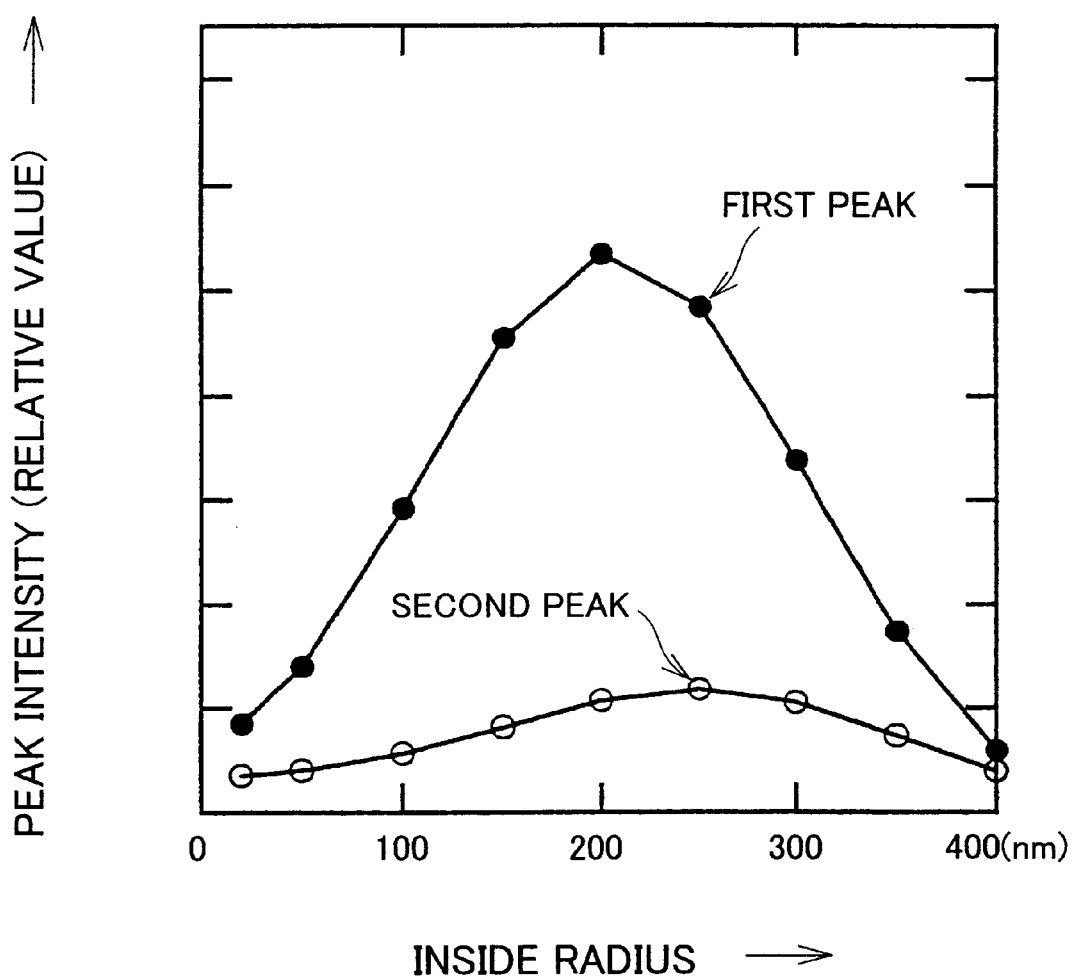
FIG. 12 is a graph showing the results of simulation on the relationship between an inside radius of a laser aperture and a peak intensity of a laser beam when the laser beam has a Gaussian distribution.

FIG. 12 shows the results of simulation on the first peak intensity of the laser beam at portion right below the shielding plate 14 and the second peak intensity at portion beside the portion of the first peak intensity with changes in inside radius, and a fixed outer radius of the laser aperture 12 of 550 nm when the laser beam being applied through the laser aperture 12 had a Gaussian distribution. It can be seen from FIG. 12 that both the first and second peak intensities of the laser beam are maximized when the inside radius of the laser aperture 12 is around 220 nm. Here, the range for the inside radius of the laser aperture 12, which ensures the optimal condition for the laser focusing, i.e., the first peak intensity of the laser beam is not less than 3 times of the second peak intensity, is from 0.08 to 0.5 times of the wavelength 650 nm of the laser beam as in the case of FIG. 10.

Figure 13:
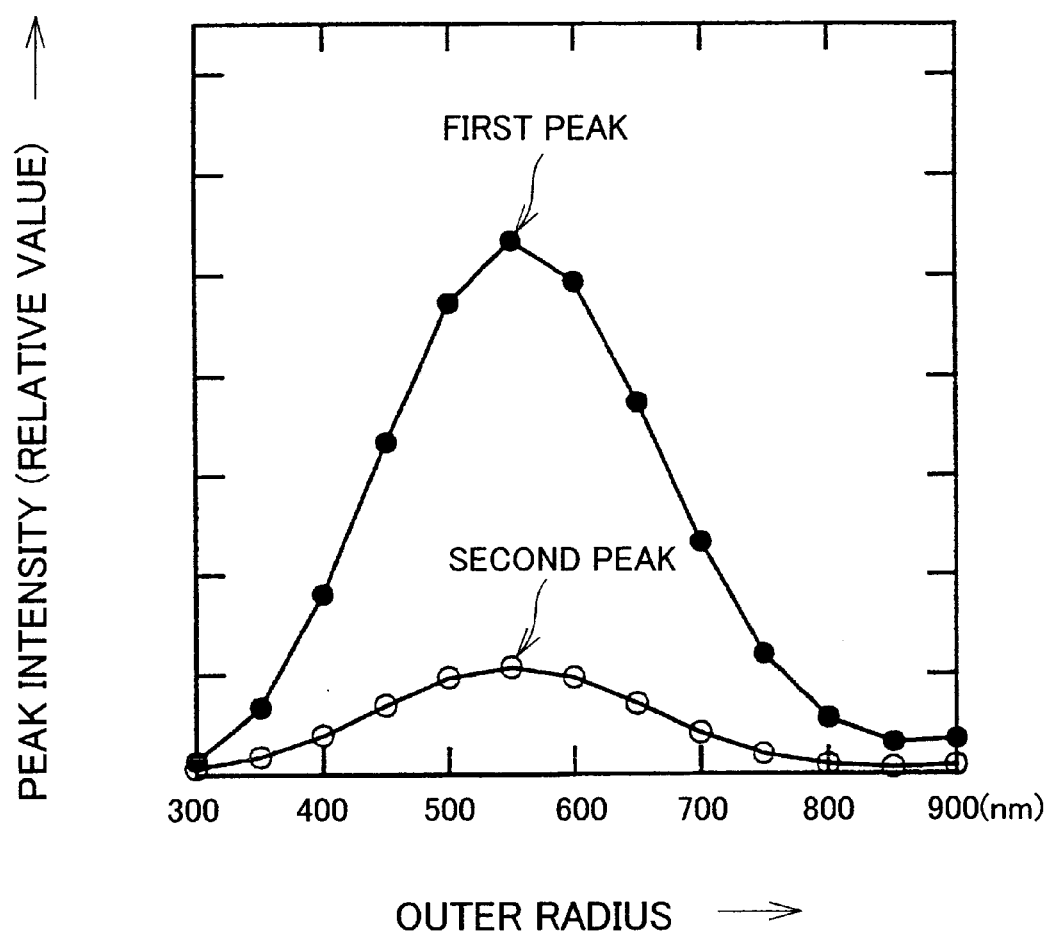
FIG. 13 is a graph showing results of simulation on the relationship between an outer radius of a laser aperture and a peak intensity of a laser beam when the laser beam has a Gaussian distribution.

FIG. 13 shows the results of simulation on the first peak intensity of the laser beam at portion right below the shielding plate 14 and the second peak intensity at portion beside the portion of the first peak intensity, with changes in outer radius, and a fixed inside radius of the laser aperture 12 of 200 nm, when the laser beam being applied through the laser aperture 12 had a Gaussian distribution. It can be seen from FIG. 13 that both the first and second peak intensities of the laser beam are maximized when the outer radius of the laser aperture 12 is around 550 nm as in the case of FIG. 11. Here, the range for the outer radius of the laser aperture 12, which ensures the optimal condition for the laser focusing, i.e., the first peak intensity of the laser beam is not less than 3 times of the second peak intensity, is increased to 850 nm, i.e., around 1.3 times of the wavelength 650 nm of the laser beam unlike the case of FIG. 11.

From the foregoing simulations, in the present invention, the optimal aperture condition of the laser aperture 12 which ensures an optimal condition for the laser focusing can be defined as the range where the outer radius R and the inside radius r satisfy the conditions of:

$\lambda/2+a\lambda \leq R \leq 1.3\lambda+a\lambda$ (a is 0 or a positive integer (a≧0)); and $0.08\lambda+b\lambda \leq r \leq 0.5\lambda+b\lambda$ (b is 0 or a positive integer not larger than a (0≦b≦a)).

The outer radius R of the laser aperture 12 is set to be not more than a radius of the surface on the light emission side of the surface-emitting laser layers 4, 5 and 6 by the aperture 13a of the upper electrode 13. The radius of the surface on the light emission side can be set up to around 20 μm. For example, in the case where the radius of the surface on the light emitting side of the surface-emitting laser layers 4, 5 and 6 is set to 10 μm, and the wavelength λ of the laser beam to 650 nm, from the above formula, an integer "a" within the range of 0≦a≦15 can be obtained, and the outer radius R of the laser aperture 12 can be set by selecting an arbitrary integer within the above range for "a".

With the structure wherein the radius of the surface on the light emitting side of the surface-emitting laser layers 4, 5 and 6 satisfies the foregoing condition, the aperture forming member can be omitted. In this case, the surface on the light emitting side of the surface-emitting laser layers 4, 5 and 6 is not covered with the aperture 13a of the upper electrode 13.

Here, in the case where the spacing between the composite magnetic recording head 17 and the magnetic recording medium 16 is filled with a medium having a diffractive index n, the substantial wavelength of the laser beam be set to λ/n for the wavelength for the optimal aperture condition of the laser aperture 12.

On the other hand, when adopting the laser aperture 12 and the shielding plate 14 in diameter outside the above ranges, undesirable conditions occurred such as the displacement in laser focusing peak at portion right below the shielding plate 14, a decrease in laser intensity at portion right below the shielding plate 14, or an increase in laser focusing peak in other portion than the portion right below the shielding plate 14. It is therefore preferable that the laser aperture 12 and the shielding plate 14 be formed in size within the above-defined ranges.

Therefore, according to the result of simulation on the optical interference, in the case of adopting the red laser beam (wavelength: 650 nm) and the laser aperture 12 in doughnut shape, in order to focus a laser beam effectively, it is desirable that the laser aperture 12 in doughnut shape to have an inside diameter within the range of from 160 nm to 650 nm, and an outer diameter within the range of from 650 nm to 1700 nm. Namely, it is desirable to set the diameter of the shielding plate 14 within the range of from 160 nm to 650 nm.

The laser aperture 12 is formed in doughnut shape on the upper surface of the surface-emitting laser layer 6 and the insulating member 7. Specifically, the laser aperture 12 is formed by forming a ring-shaped upper electrode 13 having an outer diameter of 5 μm and an inside diameter of from 650 nm to 1700 nm by the photolithography, and further the shielding plate 14 having a diameter within a range of from 160 nm to 650 nm is formed at a center by the electron beam photolithography.

By utilizing the apodization effect, a required laser intensity can be obtained by adjusting the area of the aperture. Further, according to the foregoing method of emitting a laser beam, a passive optical system can be omitted, and a simplified structure can therefore be achieved.

The method of manufacturing the composite magnetic recording head 17 of the foregoing structure will be explained.

First, the light source 17a is formed by the organic metal vapor-phase growth and the molecular beam epitaxy, specifically by forming the high density doping semiconductor layer 2 and the surface-emitting laser layers 4, 5 and 6 on the substrate 1 made of a compound semiconductor. For the compound semiconductor, the III-V group compound semiconductor of GaAs, InAs, AlAs, GaSb, InSb, InP, GaN, etc., may be adopted. Here, in view of doping control, or adjustability of grating, GaAs which is generally used in manufacturing the semiconductor laser is adopted as a compound semiconductor.

As the high density doping semiconductor layer 2, a high density n-type doping GaAs is laminated on the n-type GaAs substrate (compound semiconductor substrate 1). Thereafter, the surface-emitting laser layers 4, 5 and 6 are laminated. For the surface-emitting laser layers, a-III-V series compound semiconductor, such as GaInAsP series, AlGaAs series or InGaAs series semiconductor may be adopted. For example, in the case of adopting a red laser beam, an AlGaAs series surface-emitting laser beam may be adopted.

The surface-emitting laser layers 4 and 6 are composed of reflective films of a multi-layered structure, and the surface-emitting laser layer 5 is composed of an active layer. For the reflective films of the multi-layered structure, an AlGaAs/GaAs layer is formed in 3 μm thick in such a manner that the surface-emitting laser layer 4 and the surface-emitting layer 6 are doped in n-type and p-type respectively. The surface-emitting laser layer 5 serving as an active layer is formed by a quantum well layer made of AlGaAs/GaAs in 8 nm to 50 nm thick.

Then, the surface-emitting laser layers 4, 5 and 6 of the laminated structure are processed in cylinder 15 by the electron beam photolithography and the reactive ion etching. Here, the high density doping semiconductor layer 2 of the base is also etched in 2 μm thick. Further, it is preferable that the diameter of the cylinder 15 be set within a range of from 1 to 2 μm, so that the upper electrode 13 and the laser aperture 12 can be formed on the upper surface of the surface-emitting optical laser layer 6.

Next, the lower electrode 3 is formed on the high density doping semiconductor layer 2. Here, for the material of the lower electrode 3, metal of high electrical conductivity is desirable. In this example, the lower electrode 3 made of Au laminated to the thickness of 1 μm is adopted. The surface of the lower electrode 3 is then coated with the insulating member 7. Here, for the insulating member 7, the polyimide layer made of heat resistance polymer may be formed in around 1 μm thick.

Then, on the lower electrode 3 coated with the insulating member 7, spiral coil layers 8, 9, 10 and 11 are laminated alternately with the insulator 7 as illustrated in FIGS. 3(a) through 3(d). The spiral coil layers 8, 9, 10 and 11 are formed in an outer diameter of 1 mm, an inside radius of 2 μm to 3 μm, a coil width of 1 μm, a coil interval of 1 μm, and a film thickness of 1 μm.

Here, the spiral coil layers 8, 9, 10 and 11 are interlayer insulated with the insulator 7 respectively. However, as illustrated in FIGS. 3(a) through 3(d), an inner end 8a of the spiral coil first layer 8 and an inner end 9a of the spiral coil second layer 9 are connected; an outer end 9b of the spiral coil second layer 9 and an outer end 1ob of the spiral coil third layer 10 are connected; and the inner end 10a of the spiral coil third layer 10 and the inner end 11a of the spiral coil fourth layer 11 are connected. With this laminated structure of the spiral coil layers 8, 9, 10, and 11, by applying current from the outer end 8b of the spiral coil first layer 8, current flows in clockwise direction in all of the four layers by applying current to the outer end 11b of the spiral coil fourth layer 11.

For the material of the spiral coil layers 8, 9, 10, 11, a metal of high electrical conductivity, such as Au, is desirable. In this example, Au is laminated in 1 μm. For the insulating member 7, a polyimide layer is laminated in 500 nm thick for interlayer-insulating the spiral coil layers 8, 9, 10, 11 respectively.

Thereafter, on the upper surface of the surface-emitting laser layer 6 and the insulating member 7, films are laminated for the shielding plate 14 and the upper electrode 13, thereby forming the laser aperture 12 in doughnut shape.

Here, the transparent electrode ITO (InxSynyOz: Indium Tin Oxide Film) may be formed on the upper surface of the surface-emitting laser layer 6, and the surface of the transparent electrode ITO may be further masked to limit the laser beam emitting area, thereby forming the laser aperture 12.

The upper electrode 13 and the shielding plate 14 to be formed in this process need to be functioned as a shielding member for shielding a laser beam. For the ring-shaped upper electrode 13, a metal of high electrical conductivity and refractive index is needed, and for example, Au, AuZn, etc., is desirable. In the example of the present embodiment, Au ring-shaped upper electrode film is formed in 100 nm thick by the photolithography. For the shielding plate 14, any metal of high refractive index may be adopted, and the Al shielding plate 14 is formed in 50 nm thick, for example, by the electron beam photolithography.

Other than the above metal of high refractive index, by adopting a soft magnetic metal of high reflective index for the shielding plate 14, such as NiFe, it is possible to increase the density of a magnetic flux to be generated from the spiral coil layers 8, 9, 10 and 11 at portion right below the shielding plate 14.

Further, it is possible to form the ring-shaped upper electrode 13 and the shielding plate 14 in the same process by adopting same material and the same thickness. It is therefore possible to form the laser aperture 12 by the conventional way of mounting the upper electrode for the surface-emitting laser.

Lastly, the uppermost part of the composite magnetic recording head 17 is coated with a passivation protective layer (not shown).

In the present embodiment, the shielding plate 14 is used only for focusing the laser beam, and an optical-assisted magnetic recording operation is performed by the magnetic field generated from the spiral coil layers 8, 9, 10 and 11 of four-layer laminated structure. Therefore, when the composite magnetic recording head 17 and the magnetic recording medium 16 are positioned an interval of not more than 100 nm (shorter than a quarter of the wavelength), changes the size of focused laser beam and the magnetic field distribution with changes in interval would be smooth, thereby realizing a magneto-optical recording operation under stable conditions.

Figure 4:
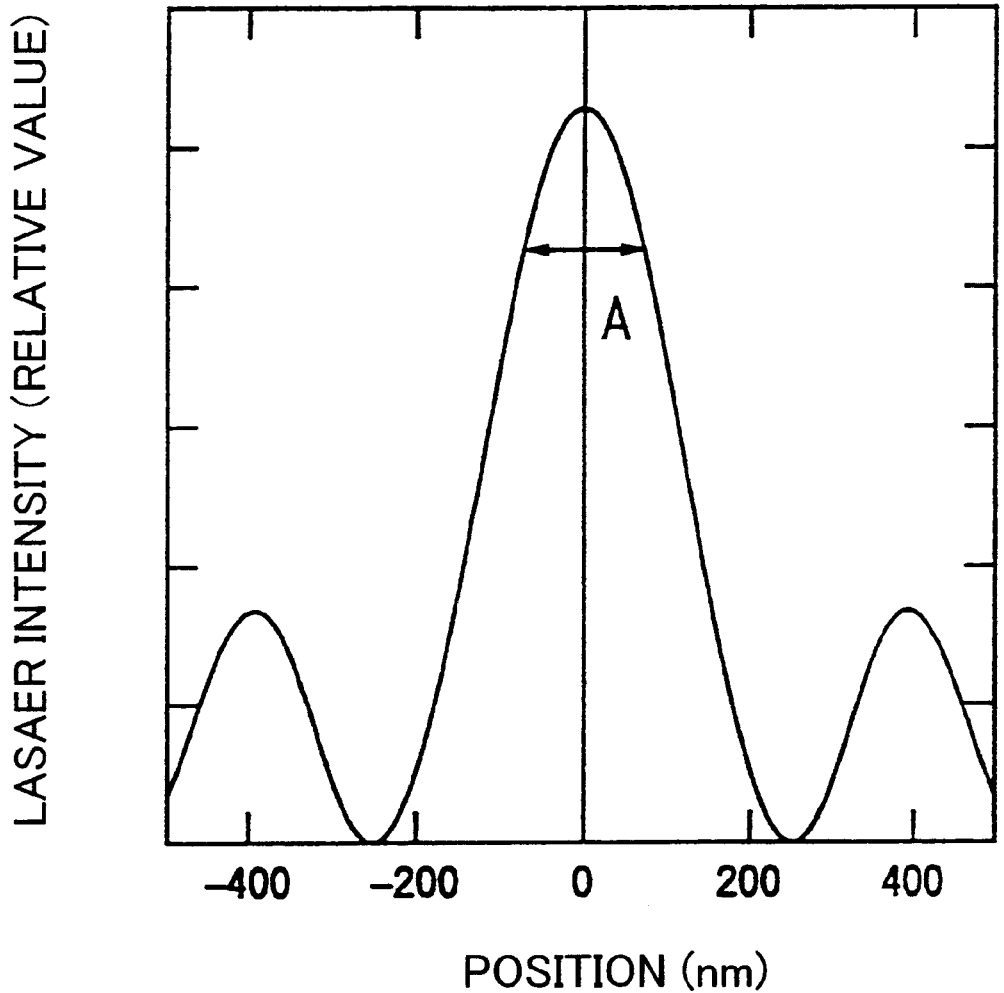
FIG. 4 is a graph showing an intensity distribution on a surface irradiated with a laser beam emitted from a laser aperture of the composite magnetic recording head of FIG. 1.

FIG. 4 shows the laser intensity distribution on the irradiation surface 18 of the laser beam emitted from the laser aperture 12 of red laser when the laser aperture 12 and the irradiation surface 18 are positioned at an interval of not more than 100 nm.

It can be seen from FIG. 4 that at portion right below the shielding plate 14, a laser spot having a diameter of a main spot of around 400 nm is formed, and side peaks appeared at sub spots formed at portions on both sides of the main spot. Here, a magnetic recording with a bit diameter of 100 nm can be realized by designing the magnetic recording medium 16 to have the following magnetic characteristics. That is, under an applied laser beam of an intensity at an area A with a main spot diameter of 100 nm, a coercive force of the magnetic recording medium 16 is smaller than a maximum externally applied magnetic field from the spiral coil layers 8, 9, 10 and 11.

As a result, a optical-assisted magnetic recording can be realized, and a high density magnetic recording of not less than 64 Gb/inch$^2$ can be achieved at a bit diameter of not more than 100 nm. Further, the laser is emitted from the side of the magnetic head, and it is therefore possible to perform an optical-assisted magnetic recording on both surfaces of the magnetic recording medium.

According to the structure of the present embodiment, the composite magnetic recording head 17 and the irradiation surface 18 are positioned at a smaller interval than a quarter of the full wavelength. Therefore, the difference in laser optical path hardly varies, and thus the laser focusing efficiency is hardly affected by the flying height of the composite magnetic recording head 17.

Figure 5:
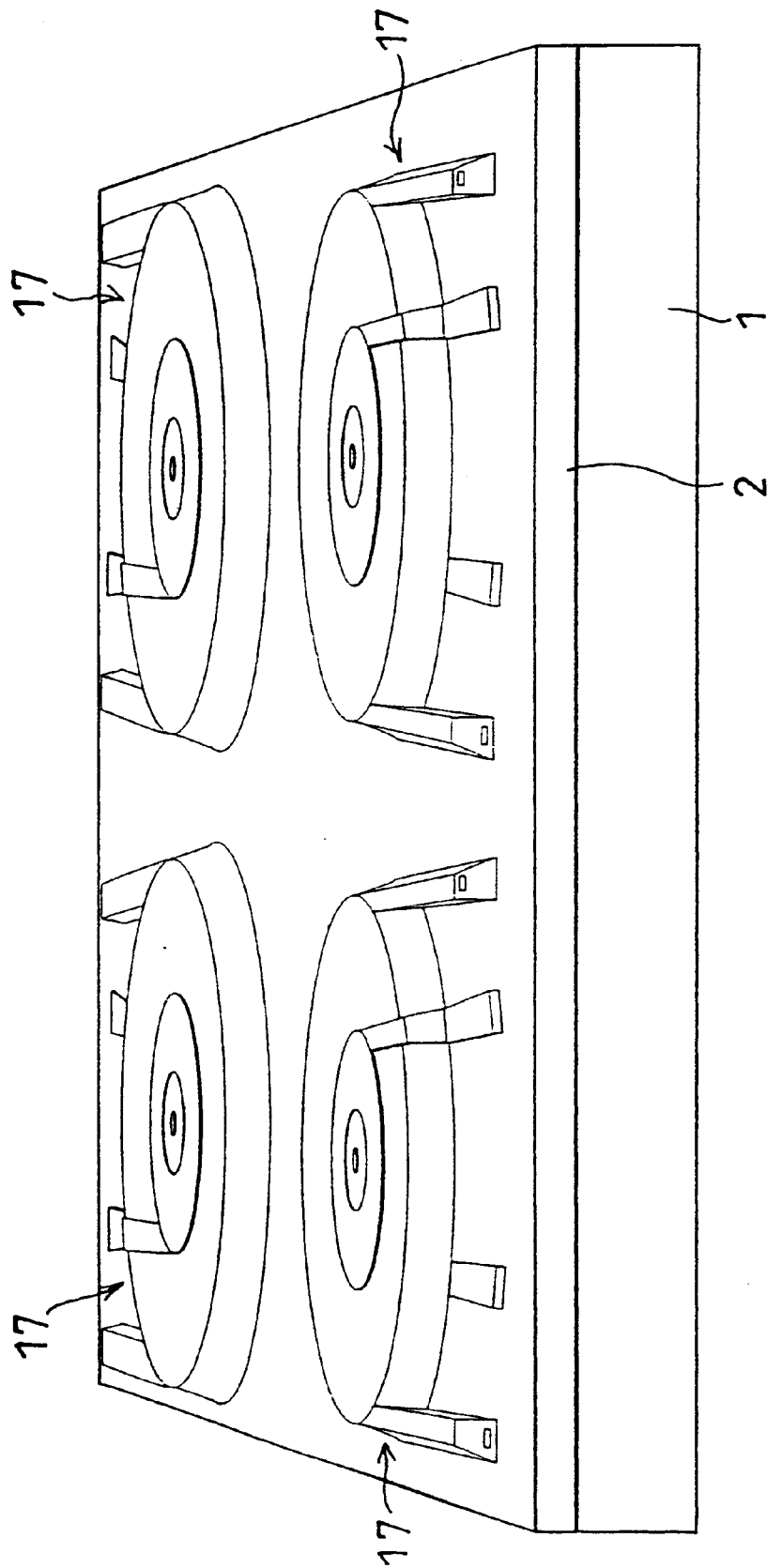
FIG. 5 is a view schematically showing the magnetic recording device of the present invention.

Further, by forming a plurality of composite magnetic recording heads 17 of the foregoing structure in the same process, for example, a magnetic head of the structure of FIG. 5 may be obtained. With this structure, a simultaneous multiple magnetic recording can be realized by means of a single magnetic head. Further, by forming the reproducing head, or the optical servo system in the surface-emitting laser, a plurality of functional elements required for optical-assisted magnetic recording/reproducing can be integrated into single magnetic head.

Second Embodiment

The following descriptions will discuss another embodiment of the present invention. For ease of explanation, members (structures) having the same functions as those shown in the drawings pertaining to the first embodiment above will be given the same reference symbols, and explanation thereof will be omitted here.

Figure 6:
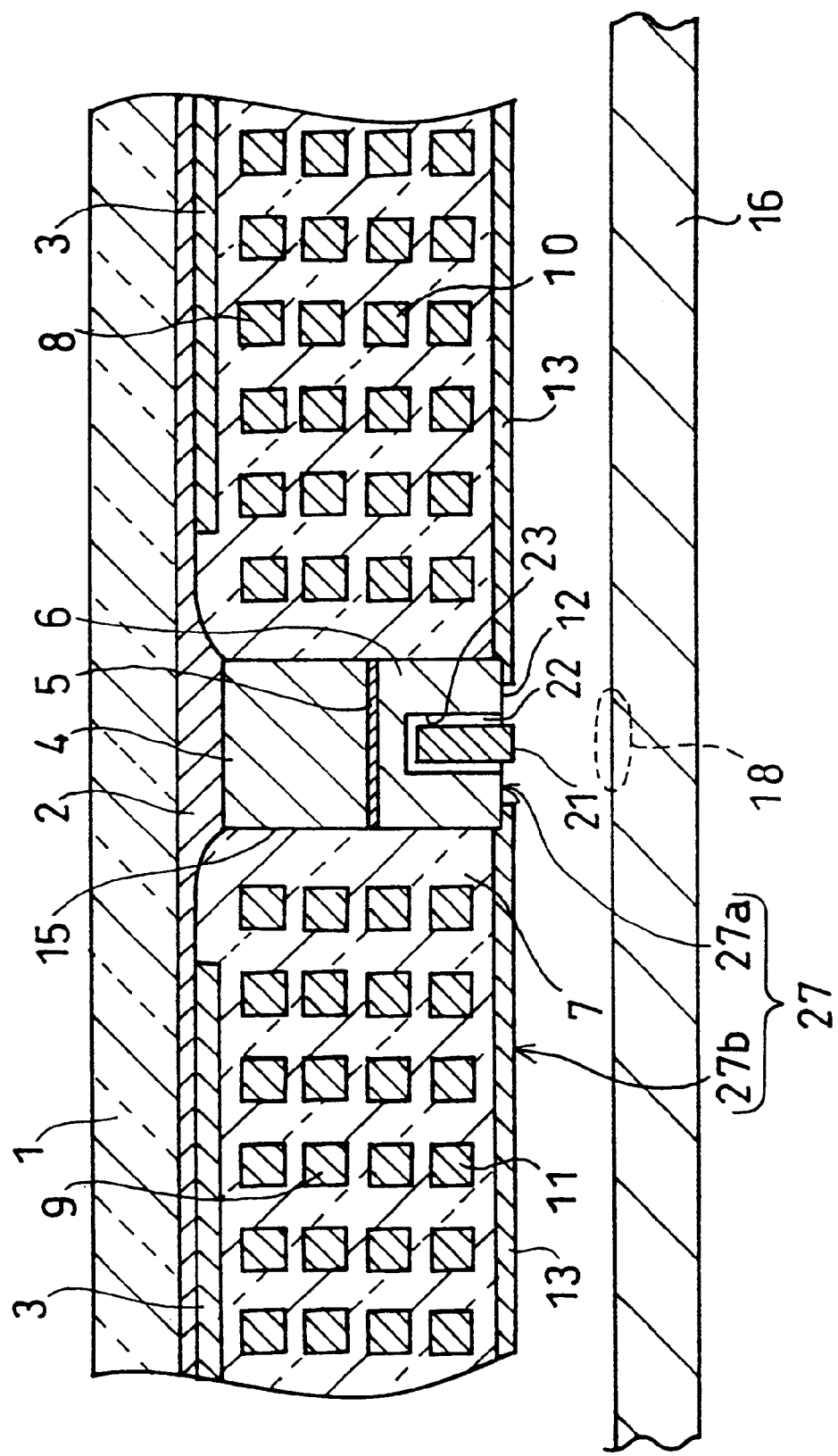
FIG. 6 is a cross-sectional view of essential parts of the structure of a composite magnetic recording head in accordance with another embodiment of the present invention.

As illustrated in FIG. 6, a composite magnetic recording head 27 in accordance with the present embodiment includes a light source 27a as a light emitting device, and a magnet coil 27b. The magnet coil 27b of the present embodiment has the same structure as the magnet coil 17b of the first embodiment. The light source 27a of the present embodiment differs from the light source 17a of the first embodiment in that a main magnetic pole 21 is buried at the center of the surface-emitting laser layer 6 in replace of the shielding plate 14 adopted in the light source 17a of the first embodiment.

Then, the main magnetic pole 21 is coated with the insulating member 22 so as to keep the main magnetic pole 21 insulated from the surface-emitting laser layer 6.

Together with the magnet coil 27b, the main magnetic pole 21 is used for applying a magnetic field to the magnetic recording medium 16. The main magnetic pole 21 serves also as the shielding member for shielding light emitted from the center of the light source 27a.

As described, with the structure of adopting the main magnetic pole 21 in replace of the shielding plate 14, it is also possible to focus the light emitted from the light source 27a onto the irradiation surface 18 of the magnetic recording medium 16 as in the structure of the first embodiment.

Next, the method of manufacturing the composite magnetic recording head 27 of the foregoing structure will be explained. Up to the process of forming the laminated structure of the surface-emitting laser layers 4, 5 and 6 into the column 15, the manufacturing process of the light source 27a of the present embodiment is the same as that of the first embodiment, and thus explanations thereof shall be omitted here.

First, by the convergent ion beam etching, at the center of the surface of the surface-emitting laser layer 6 serving as the upper multi-layered reflective layer, a hole 23 in depth of 2 μm having a diameter of 0.3 μm to 0.6 μm is formed. As a result, the column 15 is formed in a circular cylindrical structure. Further, the inner side surface and the bottom part of the hole 23 are coated with the insulating member 22. For the material of the insulating member 22, heat-resistant polymer or $Al_2O_3$ may be adopted. Here, the insulating member 22 is coated with polyimide to a thickness of 500 nm.

Next, by the electron beam lithography and the sputtering method, a main magnetic pole 21 made of soft magnetic metal is formed to be stored within the hole 23 of the column 15. The main magnetic pole 21 has a cylindrical shape having a diameter in a range of from 0.2 μm to 0.5 μm and a height of 1.5 μm. Here, for the material of the main magnetic pole 21, NiFe is preferable.

In the column 15, the main magnetic pole 21 is formed to a part right in front of the surface-emitting laser layer 5 (active layer). The foregoing structure is adopted for smoothly injecting carriers efficiently to the surface-emitting laser layer 5 so that the surface-emitting layer 5 can be prevented from being damaged by the formation of the main magnetic pole 21.

Lastly, the uppermost part of the composite magnetic recording head 27 is coated with a passivation protective layer (not shown) in other area than the laser aperture 12 including the main magnetic pole 21.

As described, in the present invention, the main magnetic pole 21 functions also as the shielding plate 14 of the first embodiment.

Figure 7:
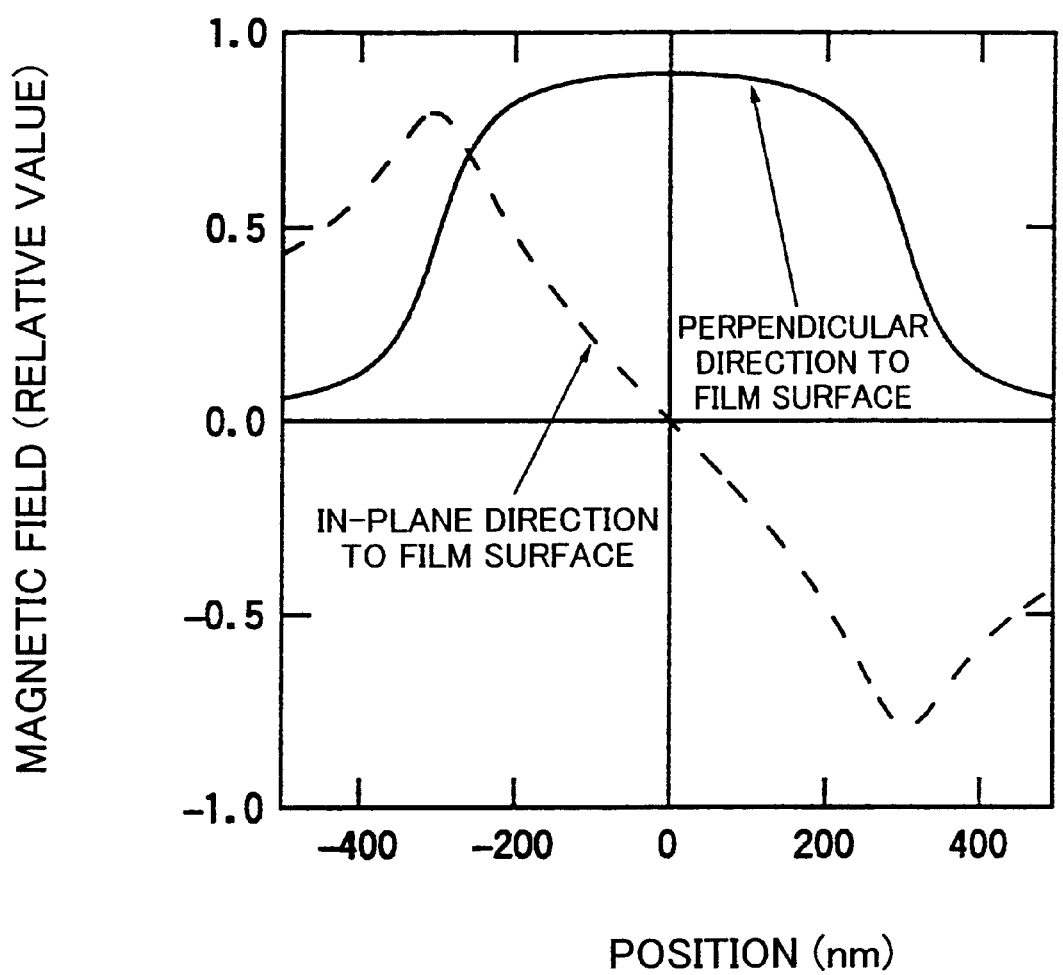
FIG. 7 is a graph showing an intensity distribution of a main magnetic pole of the composite magnetic recording head of FIG. 6.

FIG. 7 shows a magnetic field distribution of the magnetic recording medium 16 at portion right below the center of the main magnetic pole 21. It can be seen from the graph of FIG. 7 that as in the first embodiment, by the apodization effect, a magnetic field in a direction perpendicular to the film surface is dominated in the heated area having a spot diameter of 100 nm heated with an application of the laser beam. This shows that a still higher flux density of the externally applied magnetic field can be achieved by the spot heated with the projection of the laser beam as compared to the first embodiment, which makes it possible to perform a sharp optical-assisted magnetic recording.

Therefore, as in the first embodiment, by performing an optical-assisted magnetic recording so as to have a bit diameter of not more than 100 nm, a high density perpendicular magnetic recording of not less than 64 Gb/inch$^2$ can be achieved.

Figure 8:
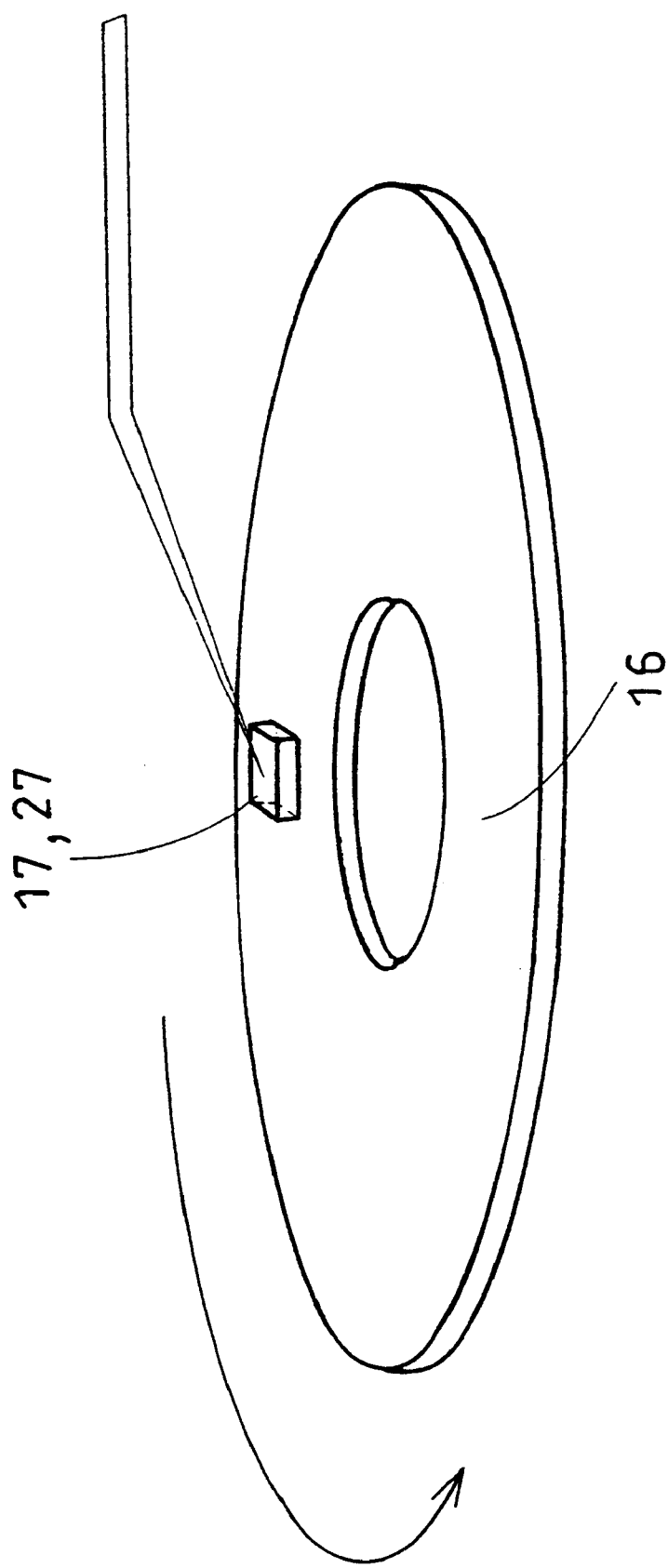
FIG. 8 is a view schematically showing a structure composed of a plurality of composite magnetic recording heads.

As described, the composite magnetic recording heads 17 and 27 adopted in the first and second embodiments are coated so as to have a flat structure in regions other than and the laser aperture 12 including the shielding plate 14 and the main magnetic pole 21. Therefore, for example, as illustrated in FIG. 8, it is possible to suppress the generation of a disturbance of air when rotating the magnetic recording medium 16 at high speed, for example, at 3600 rpm. As a result, even when rotating the magnetic recording medium 16 at high speed, the flying height of the composite magnetic recording head 17 can be stabilized, thereby performing recording and reproducing operations under stable conditions.

Other than the above-explained embodiments, various other modifications may be adopted, for example, as explained below.

In the composite magnetic recording head, a magnetic sensor for detecting a leakage of magnetic flux on the recording medium and an optical servo system can be provided in one integral part. As a result, a plurality of functional elements required for the optical-assisted magnetic recording and reproduction can be integrated into single head.

According to the magnetic recording method of the present invention, by adjusting the size or the shape of the shielding plate, it is possible to form a laser spot on the recording medium in an optimal size or shape. As a result, a magnetic recording can be formed in different bit shape from the shape of fletchings in the magneto-optical recording.

According to the magnetic recording method of the present invention, data can be recorded magnetically at a central of the light spot formed on the recording medium. As a result, a high density magnetic recording can be achieved in an overlapped area between the dense magnetic flux distribution and the thermal distribution at the central of the laser spot. According to the foregoing magnetic recording method, a servo system for the positioning of the laser focused position relative to the shielding plate or the main magnetic pole of the magnetic recording head can be omitted.

In the magnetic recording device of the present invention, a laser is provided as a light source, and the magnetic recording head provided with a magnet coil for use in magnetic recording formed at the laser aperture magnetically records data at an interval from the recording medium layer of not more than 100 nm. According to the foregoing structure, in the case where the magnetic head and the magnetic recording medium are positioned at a shorter interval than a quarter of the wavelength, a difference in laser optical paths hardly varies, and thus a laser beam focusing efficiency hardly changes. As a result, a magnetic recording can be performed at a short interval between the magnetic head and the magnetic recording medium of not more than 100 nm.

The magnetic recording device of the present invention includes a laser as a light source, and a magnetic recording head provided with the magnet coil for use in magnetic recording and the main magnetic pole in the laser aperture, and the magnetic recording head records data at an interval from the recording medium layer of not more than 100 nm. According to the foregoing structure, in the case where the magnetic head and the magnetic recording medium are positioned at a shorter interval than a quarter of the wavelength, a difference in laser optical paths hardly varies, and thus a laser beam focusing efficiency hardly changes. As a result, a magnetic recording is can be performed at a short interval between the magnetic head and the magnetic recording medium of not more than 100 nm.

As described, the light emitting device of the present invention may be arranged such that when the laser aperture is set so a to have a radius R within the range of $\lambda/2+a\lambda R \leq 1.3\lambda+a\lambda$ ($\lambda$ is a wavelength of the laser beam, and a is 0 or a positive integer ($0 \leq a$)), the shielding member shields only a laser beam which passes through an area with a radius r from the center of the laser aperture within the range of $0.08\lambda+b\lambda \leq r \leq 0.5\lambda+b\lambda$ (b is 0 or a positive integer not larger than a ($0 \leq b \leq a$)).

As a result, the apodization effect can be achieved more effectively.

The light emitting device of the present invention may be arranged such that the light source includes a laser emitting member and an aperture forming member for forming the laser aperture, wherein the radius of the laser aperture is set to be not more than a radius of the surface on the laser emission side of the laser emitting member by the aperture forming member.

According to the foregoing structure, by adopting the aperture forming member, the radius of the laser aperture can be set as desired with ease.

With the structure wherein the radius R of the laser aperture satisfies the condition of $\lambda/2+a\lambda \leq R \leq 1.3\lambda+a\lambda$ (a is 0 or a positive integer ($0 \leq a$)), the aperture forming member can be omitted from the light source. In this case, the surface on the laser emission side of the laser emitting member is the laser aperture. It should be noted here that the aperture forming member may be formed so as to be in contact with or apart from the surface on the laser emission side of the laser emitting member.

The magnetic recording head of the present invention may be arranged so as to include the shielding member for shielding only a laser beam which passes through the area including the center of the laser aperture of all the laser beams which pass through the laser aperture.

According to the foregoing structure, by the apodization effect, a laser beam can be focused at portion right below the shielding member, thereby realizing an optical-assisted high density magnetic recording.

The magnetic recording head of the present invention may be arranged such that the shielding member is made of soft magnetic metal.

According to the foregoing structure, the soft magnetic metal serves as a main magnetic head for applying a magnetic field to a magnetic recording medium. By providing the main magnetic head which functions also as the shielding member at the center of the aperture, a laser beam can be focused at portion right below the main magnetic head. Further, by adopting the main magnetic head made of soft magnetic metal such as permalloy or ferrite, etc., (high magnetic permeability material), a higher density of the magnetic flux can be achieved at portion right below the magnetic head. In this way, a high density magnetic recording can be realized at portion at the center of the laser focus position.

The magnetic recording head of the present invention may be arranged such that the light source is constituted by the surface-emitting semiconductor laser.

According to the foregoing structure, since the magnetic recording head is formed directly at the surface-emitting laser aperture, the magnetic recording head can be formed into a simpler structure and lighter weight, thereby realizing a composite magnetic recording head suited for mass production.

In the present invention, it may be arranged such that a plurality of magnetic recording heads are provided along the recording surface of the magnetic recording medium.

According to the foregoing structure, it is possible to manufacture a plurality of magnetic recording heads at one time in the same process, and a simultaneous multiplex magnetic recording can be realized by means of single magnetic head.

The magnetic recording head of the present invention may be arranged such that:

the light source includes a laser emitting member and an aperture forming member for forming said laser aperture, wherein the radius R of the laser aperture is set to be not more than a radius of the surface on the light emission side of the laser emitting member by the aperture forming member.

According to the foregoing structure, by adopting the aperture forming member, the radius of the laser aperture can be set as desired with ease.

The magnetic recording device of the present invention may be arranged such that the shielding member is made of soft magnetic metal.

According to the foregoing structure, since the shielding member made of soft magnetic metal is adopted, the main magnetic head for applying a magnetic field to the magnetic recording medium can be formed in the laser aperture.

As a result, a magnetic recording can be performed in an overlapped area between the thermal distribution of the magnetic recording medium generated by the laser spot focused at portion right below the shielding member and a sharp and dense magnetic flux distribution of a magnetic field applied by the magnet coil and the main magnetic pole head, thereby realizing a high density magnetic recording.

The magnetic recording device of the present invention may be further arranged such that the light source is composed of the surface-emitting semiconductor laser.

According to the foregoing structure, the light source is composed of the surface-emitting semiconductor laser, and the magnetic recording head can be formed into a simpler structure and lighter weight, thereby realizing a composite magnetic recording head suited for mass production. As a result, the composite magnetic recording device including such composite magnetic recording head can be manufactured with ease.

The light emitting device of the present invention may be arranged so as to include:

a light source for emitting a laser beam, wherein a laser aperture has a radius R within the range of $\lambda/2+a\lambda \leq R \leq 1.3\lambda+a\lambda$ ($\lambda$ is a wavelength of the laser beam, and a is 0 or a positive integer ($a \geq 0$)); and a shielding member for shielding only a laser beam, which passes through a predetermined area at a center of the laser aperture, of all the laser beams which pass through the laser aperture.

The magnetic recording device of the present invention may be arranged so as to include:

a light emitting device composed of a light source for emitting a laser beam and a shielding member for shielding only a laser beam which passes through a predetermined area at a center of a laser aperture, of all the laser beams which pass through the laser aperture, wherein the laser aperture has a radius R within the range of $\lambda/2+a\lambda \leq R \leq 1.3\lambda+a\lambda$ ($\lambda$ is a wavelength of a laser beam)

a magnet coil for applying a magnetic field to the magnetic recording medium, wherein the light emitting means forms a light spot by focusing the laser beam onto the magnetic recording medium using the shielding member, and the magnet coil applies the magnetic field for magnetic recording in an area including a light spot forming region of the magnetic recording medium.

As described, the light emitting device of the present invention may be arranged so as to include:

a light source for emitting a laser beam, wherein a laser aperture serving as a laser emitting surface has a radius within a range of from half to full wavelength of the laser beam; and a shielding member for shielding only a laser beam, which passes through a predetermined area at a center of the laser aperture, of all laser beams which pass through the laser aperture.

The light emitting device having the foregoing structure may be arranged such that:

the shielding member shields a laser beam which passes through an area with a radius of from ⅛ wavelength to ½ wavelength from the center of the laser aperture.

The magnetic recording head having the foregoing structure may be further arranged such that:

a radius of a laser aperture is set within a range of from half to one wavelength of the laser beam, the magnetic recording head, and further includes:

a shielding member for shielding only a laser beam which passes through a predetermined area at a center of the laser aperture of all laser beams which pass through the laser aperture.

The magnetic recording device of the present invention may be arranged so as to include:

light emitting means provided with i) a light source for emitting a laser beam, wherein a laser aperture serving as a laser emitting surface has a radius within a range of from half to full wavelength of the laser beam, and ii) a shielding member for shielding only a laser beam, which passes through a predetermined area at a center of the laser aperture, of all laser beams which pass through the laser aperture; and an electromagnet coil for applying a magnetic field to the magnetic recording medium, wherein the light emitting means forms a light spot by focusing the laser beam onto the magnetic recording medium using the shielding member, and the magnet coil applies the magnetic field for magnetic recording onto an area including a light spot forming region of the magnetic recording medium.

The invention being thus described, it will be obvious that the same may be varied in many ways. Such variations are not to be regarded as a departure from the spirit and scope of the invention, and all such modification as would be obvious to one skilled in the art are intended to be included within the scope of the following claims.

What is claimed is:

1. A magnetic recording head, comprising:
a light source for emitting a laser beam, said light source having a laser aperture that provides a laser emitting surface; and
a magnet coil for use in magnetic recording,
wherein said magnet coil is integrally provided with said light source and wherein a main magnetic pole of said magnetic coil is disposed at a center of the laser aperture.

2. A magnetic recording head, comprising:
a light source for emitting a laser beam; and
a magnet coil for use in magnetic recording,
wherein said magnet coil is integrally provided with said light source and wherein a main magnetic pole of said magnetic coil is disposed at a center of a laser aperture serving as a laser emitting surface of said light source, wherein:
said laser aperture has a radius R within the range of:
$\lambda/2 + a\lambda \leq R \leq 1.3\lambda + a\lambda$ ($\lambda$ is a wavelength of the laser beam, and a is 0 or a positive integer (a>≠0)), said magnetic recording head further comprising:
a shielding member for shielding only a laser beam, which passes through a predetermined area at a center of said laser aperture, of all laser beams which pass through said laser aperture.

3. The magnetic recording head as set forth in claim 2, wherein:
said light source is composed of a surface-emitting semiconductor laser.

4. The magnetic recording head as set forth in claim 2, wherein:
said magnetic recording head is formed in plural number along a recording surface of a magnetic recording medium.

5. The magnetic recording head as set forth in claim 2, wherein:
said light source includes a light emitting member and an aperture forming member for forming said laser aperture,
wherein the radius R of said laser aperture is set to be not more than a radius of the surface on the light emission side of said laser emitting member by said aperture forming member.

6. The magnetic recording head as set forth in claim 2, wherein said shielding member is made of soft magnetic metal.

7. The magnetic recording head as set forth in claim 6, wherein said soft magnetic metal serves as a magnetic pole of said magnet coil.

8. A magnetic recording head, comprising:
a light source for emitting a laser beam;
a magnet coil for use in magnetic recording,
wherein said magnet coil is integrally provided with said light source around a center of a laser aperture serving as a laser emitting surface of said light source,
wherein said laser aperture has a radius R within the range of:
$\lambda/2 + a\lambda \leq R \leq 1.3\lambda + a\lambda$ ($\lambda$ is a wavelength of the laser beam, and a is 0 or a positive integer (a≧0)); and
a shielding member for shielding only a laser beam, which passes through a predetermined area at a center of said laser aperture, of all laser beams which pass through said laser aperture, wherein said shielding member is made of soft magnetic metal.

9. The magnetic recording head as set forth in claim 8, wherein:
said soft magnetic metal serves as a magnetic pole of said magnet coil.

10. A magnetic recording head, comprising:
a light source for emitting a laser beam; and
a magnet coil for use in magnetic recording,
wherein said magnet coil is integrally provided with said light source and wherein a main magnetic pole of said magnetic coil is disposed at a center of a laser aperture serving as a laser emitting surface of said light source, wherein:
said light source is composed of a surface-emitting semiconductor laser.

11. A magnetic recording head, comprising:
a magnet coil;
a light source for emitting a laser beam having a wavelength $\lambda$, which is provided at a center of said magnet coil, and is composed of a surface-emitting semiconductor laser layer having a center, wherein a laser aperture serving as a laser emitting surface has a radius R within the range of:

$\lambda/2+a\lambda \leq R \leq 1.3\lambda+a\lambda$ (a is 0 or a positive integer (a≧0)); and a shielding member provided at a center of the laser emitting surface of said light source, wherein the shielding member comprises a main magnetic pole that is disposed said center of the surface-emitting semiconductor laser layer.

12. A magnetic recording device, comprising:

light emitting means which includes a) a light source for emitting a laser beam having a wavelength λ, wherein a laser aperture serving as a laser emitting surface has a radius R within the range of $\lambda/2+a\lambda \leq R \leq 1.3\lambda+a\lambda$ (a is 0 or a positive integer (a≧0)), and b) a shielding member for shielding only a laser beam, which passes through a predetermined area at a center of said laser aperture, of all laser beams which pass through said laser aperture, wherein the shielding member comprises a main magnetic pole that is disposed at a center of a surface-emitting semiconductor laser layer; and a magnet coil for applying a magnetic field onto a magnetic recording medium, wherein said light emitting means forms a light spot by focusing the laser beam onto the magnetic recording medium using said shielding member; and said magnet coil applies the magnetic field for use in magnetic recording in an area including a light spot forming region of the magnetic recording medium.

13. The magnetic recording device as set forth in claim 12, wherein:

said light source is composed of a surface-emitting semiconductor laser.

14. The magnetic recording device as set forth in claim 12, wherein a distance between said magnet coil and said magnetic recording medium is not more than 100 nm.

15. The magnetic recording device as set forth in claim 12, wherein said shielding member is made of soft magnetic metal.

16. A magnetic recording device, comprising:

light emitting means which includes a) a light source for emitting a laser beam having a wavelength λ, wherein a laser aperture serving as a laser emitting surface has a radius R within the range of $\lambda/2+a\lambda \leq R \leq 1.3\lambda+a\lambda$ (a is 0 or a positive integer (a≧0)), and b) a shielding member for shielding only a laser beam, which passes through a predetermined area at a center of said laser aperture, of all laser beams which pass through said laser aperture; and a magnet coil for applying a magnetic field onto a magnetic recording medium, wherein said light emitting means forms a light spot by focusing the laser beam onto the magnetic recording medium using said shielding member;

said magnet coil applies the magnetic field for use in magnetic recording in an area including a light spot forming region of the magnetic recording medium; and wherein said shielding member is made of soft magnetic metal.

17. A magnetic recording device, comprising:

a magnet coil for applying a magnetic field onto a magnetic recording medium;

a light source, which is provided at a center of said magnet coil and is composed of a surface-emitting semiconductor laser layer, for emitting a laser beam having a wavelength λ, wherein a laser aperture serving as a laser emitting surface has a radius R within the range of: $\lambda/2+a\lambda \leq R \leq 1.3\lambda+a\lambda$ (a is 0 or a positive integer (a≧0)) so as to form a light spot of the laser beam in a magnetic field application area of the magnetic recording medium by said magnet coil; and a shielding member provided at a center of the laser emitting surface of said light source, wherein the shielding member comprises a main magnetic pole disposed at a center of the surface-emitting semiconductor laser layer.

18. The magnetic recording device as set forth in claim 17, wherein a distance between said magnet coil and said magnetic recording medium is not more than 100 nm.

19. A magnetic recording head, comprising:

a light source for emitting a laser beam; and a magnet coil for use in magnetic recording, wherein said magnet coil is integrally provided with said light source and wherein a main magnetic pole of said magnetic coil is disposed at a center of a laser aperture serving as a laser emitting surface of said light source, wherein a magnetic sensor and an optical servo system are provided in one integral part.

* * * * *